United States Patent [19]

Richter et al.

[11] 4,436,701

[45] Mar. 13, 1984

[54] ADSORPTION REACTOR AND METHOD FOR REMOVING $SO_2$ FROM WASTE GASES

[75] Inventors: Ekkehard Richter, Essen; Martin Reinke, Dortmund, both of Fed. Rep. of Germany

[73] Assignee: Bergwerksverband GmbH, Essen, Fed. Rep. of Germany

[21] Appl. No.: 427,270

[22] Filed: Sep. 29, 1982

[30] Foreign Application Priority Data

Sep. 29, 1981 [DE] Fed. Rep. of Germany ....... 3138665

[51] Int. Cl.³ .............................................. F01N 3/10
[52] U.S. Cl. ..................................... 422/173; 55/79; 55/80; 55/99; 55/390; 165/104.16; 422/146; 423/244
[58] Field of Search ............... 422/146, 173, 139, 142; 165/104.16; 55/34, 60, 73, 77, 79, 80, 99, 181, 269, 390; 423/244 R

[56] References Cited

U.S. PATENT DOCUMENTS

| | | | |
|---|---|---|---|
| 1,453,754 | 5/1923 | Cox et al. | 422/173 |
| 2,493,218 | 1/1950 | Bergstrom | 55/79 X |
| 3,177,631 | 4/1965 | Tamura | 55/79 X |
| 3,789,110 | 1/1974 | Ball | 423/244 R X |
| 3,833,051 | 9/1974 | Frank | 422/146 X |
| 3,862,295 | 1/1975 | Tolles | 423/244 R |
| 4,083,701 | 4/1978 | Noack | 55/79 X |
| 4,255,403 | 3/1981 | Mayer et al. | 55/79 X |

FOREIGN PATENT DOCUMENTS

| | | | |
|---|---|---|---|
| 2626939 | 12/1977 | Fed. Rep. of Germany | 55/79 |
| 45-2644 | 1/1970 | Japan | 422/173 |

Primary Examiner—Richard L. Chiesa
Attorney, Agent, or Firm—Michael J. Striker

[57] ABSTRACT

Waste gases pass through a bed of grained adsorption medium moving in a substantially down-stream direction, in a direction which is transverse to the bed movement direction, and a heat exchanger is inserted in the bed of the grained adsorption medium.

8 Claims, 4 Drawing Figures

ADSORPTION REACTOR AND METHOD FOR REMOVING SO₂ FROM WASTE GASES

BACKGROUND OF THE INVENTION

The present invention relates to an adsorption reactor and an adsorption method for removing $SO_2$ from waste gases. During adsorptive removal of $SO_2$ from waste gases with the aid of the above mentioned adsorption reactors, the separation degree of $SO_2$ is improved by reducing the temperature of the waste gases to, for example, below 120° C. It has been tried to introduce cold fluid into the waste gas prior to its entrance into the adsorption reactor. Such a method has the disadvantage that it involves increase of the volume of the gas and also wrong utilization of the heat content of the waste gases. A further problem is that the waste gas, prior to the entrance into the adsorption medium bed, must have always sufficiently high temperatures for avoiding corrosion by falling below the dew point of sulfuric acid. Thus, there are two contradicting requirements as to the temperature supply in or prior to adsorption reactors. It has been shown that during the above mentioned introduction of a fluid before the adsorption medium bed no adsorption problem takes place. However, the introduction for example of water in the waste gas prior to the entrance into an adsorption reactor filled with carbonaceous adsorption medium under favorable conditions, for example complete evaporation, temperatures below 110°-120° C. cannot be attained (see R. Noack, K. Knoblauch, VDI-Berichte No. 267 (1976), pages 37-42).

SUMMARY OF THE INVENTION

Accordingly, it is an object of the present invention to provide an adsorption reactor and an adsorption method in accordance with which, with elimination of corrosion, a temperature decrease which is favorable for separation of $SO_2$ is obtained and simultaneously the heat content of the waste gas can be utilized.

In keeping with these objects, and with others which will become apparent hereinafter, one feature of the present invention resides, briefly stated, in an adsorption reactor for removing $SO_2$ from waste gases which has a bed of grained adsorption material moving in substantially downstream direction so that a waste gas passes through the bed transversely of the latter, and a heat exchanger is inserted in the bed of grained adsorption material. When the adsorption reactor is designed and the adsorption method is performed in accordance with the present invention, the above mentioned disadvantages of the prior art are eliminated and the above mentioned objects of the present invention are attained.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
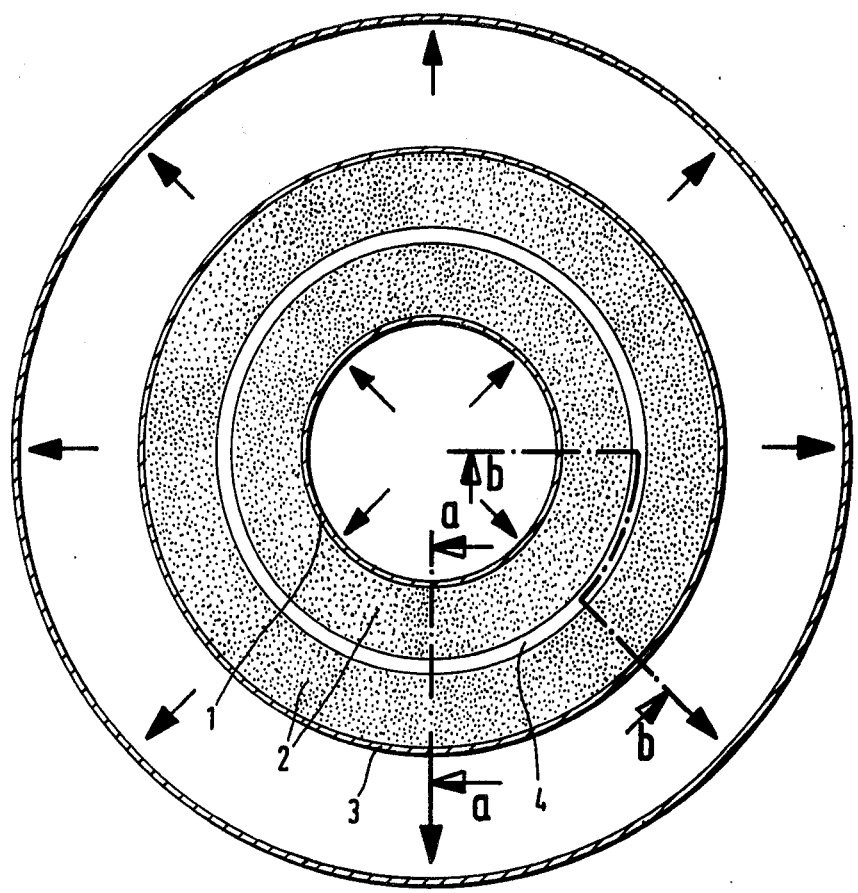
FIG. 1 is a view showing a cross section of an adsorption reactor in accordance with the present invention.

An adsorption reactor in accordance with the present invention is shown in FIG. 1 and has an approximately cylindrical ribbed wall 1 and a second ribbed wall 3 which extends substantially parallel to the ribbed wall 1. A bed of an adsorption medium 2 is located between the ribbed walls 1 and 3. A waste gas flows in a direction transverse to the bed of adsorption medium 2 first through the ribbed wall 1 into the layer of adsorption medium 2 and then leaves the adsorption reactor through the ribbed wall 3. In accordance with the inventive feature of the present invention, a heat exchanger 4 is arranged between the ribbed walls 1 and 3 in the adsorption medium bed 2. The heat exchanger 4 extends substantially parallel to the ribbed walls 1 and 3 and is permeable for a gas flow.

Figure 2:
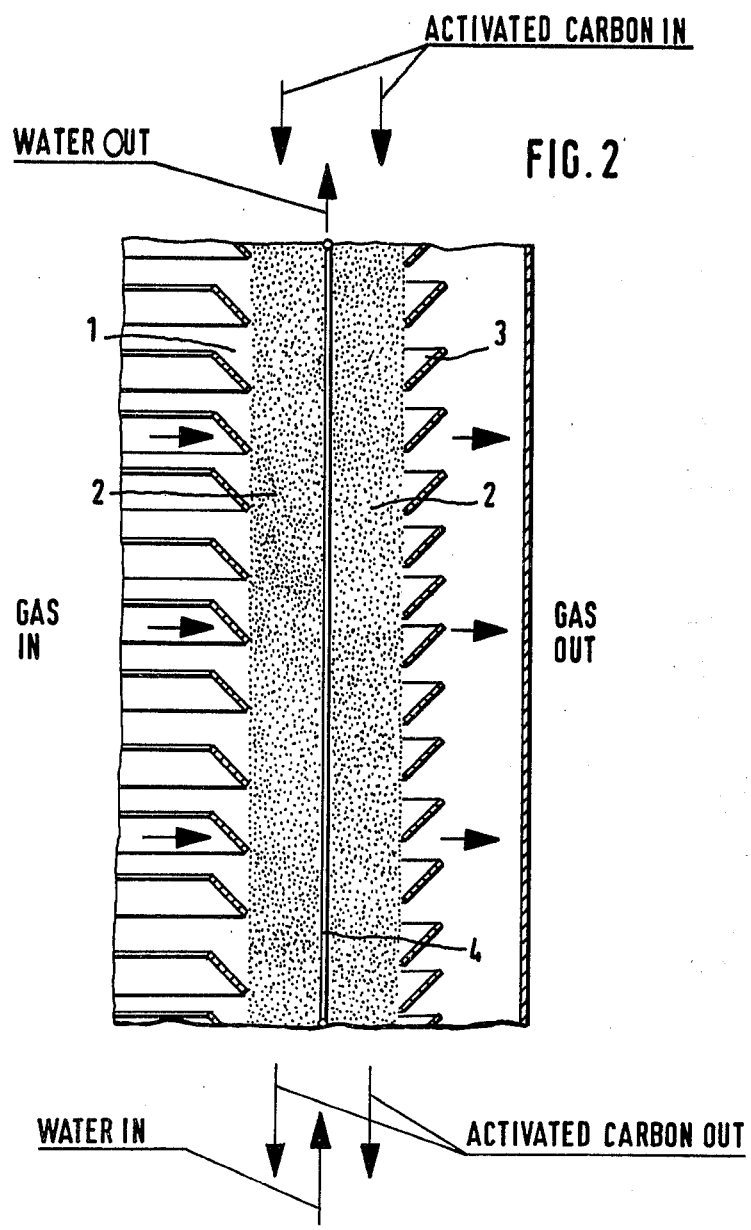
FIG. 2 is a longitudinal section of the adsorption reactor in FIG. 1, taken along the line a—a.

As can be seen from FIG. 2, the ribbed walls 1 and 3 have a plurality of ribs or lamellas 5 which are inclined and offset relative to one another. The adsorption medium is supplied at the upper end of the adsorption bed 2 and withdrawn at the lower end of the latter. A heat exchanger fluid can flow through the heat exchanger in any direction. It is also possible that in a not shown adsorption reactor, which as natural can have not only cylindrical walls but can have flat walls, a waste gas flows through the reactor not only in one direction but also in another direction.

Figure 3:
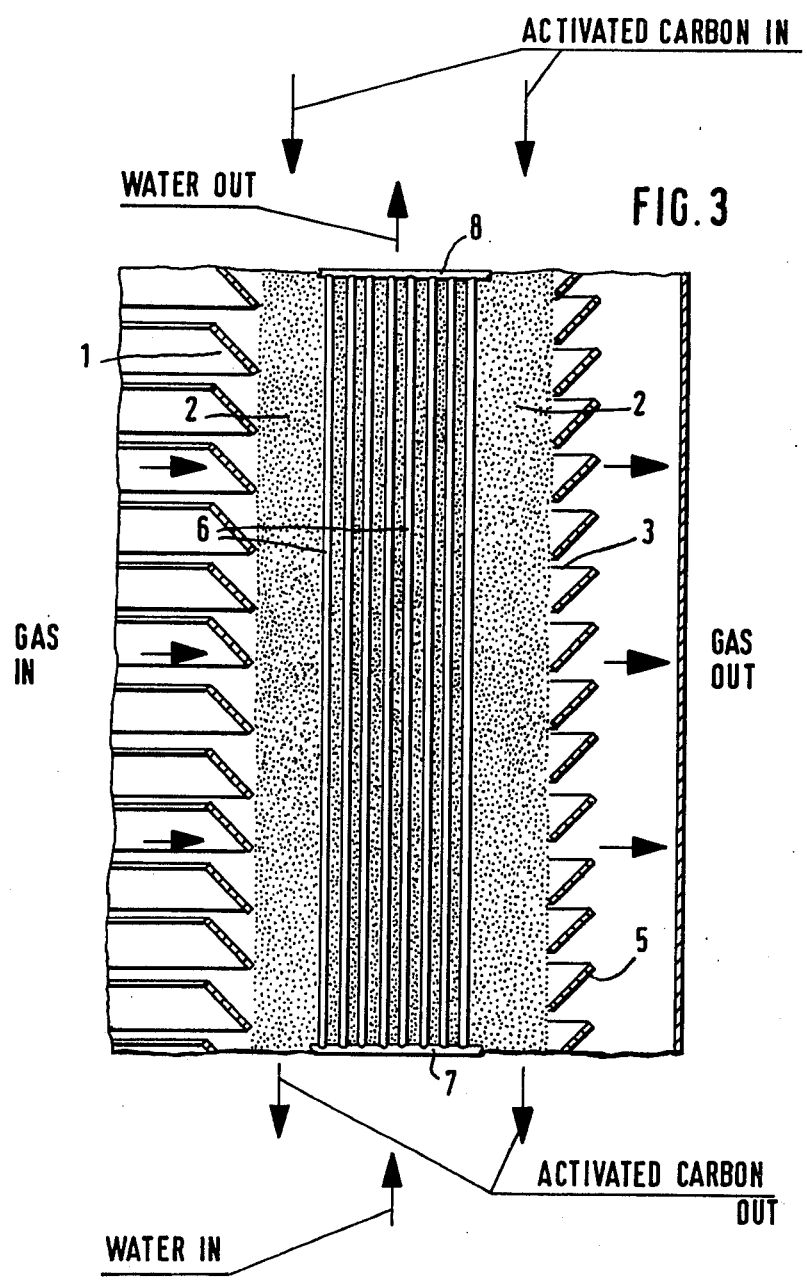
FIG. 3 is a view substantially corresponding to the view of FIG. 2 but showing a longitudinal section of the inventive reactor taken along the line b—b in FIG. 1.

As can be seen from FIG. 3 the heat exchanger 4 has a plurality of heat exchanging pipes 6 which extend, for example, along a direction of displacement of the adsorption medium in the adsorption medium bed. The heat exchanging pipes 6 are connected by a common inlet conduit 7 and a common outlet conduit 8. Such a row or register of pipes does not disturb either the passage of the waste gas, or the movement of the grained adsorption medium.

Figure 4:
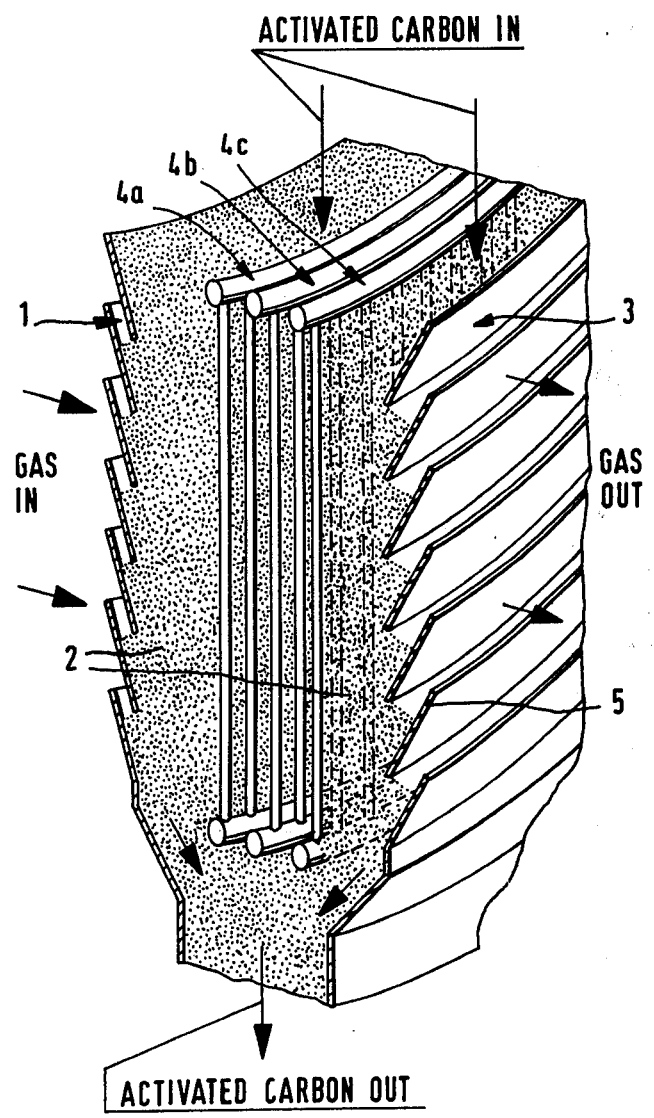
FIG. 4 is a perspective view showing the inventive adsorption reactor in accordance with a further embodiment of the invention.

FIG. 4 shows the inventive adsorption reactor in accordance with a further embodiment of the invention. The adsorption reactor shown in this Figure is a plate-shaped. The heat exchanger has a plurality of rows or registers of pipes. The rows are identified by reference numerals 4a, 4b and 4c. Each row includes a plurality of pipes arranged one near the other. Each row extends transverse to the gas flow direction, whereas the rows are offset from one another in the gas flow direction.

The waste gases from which $SO_2$ is separated are generally fumes or flue gases of power plants. However, the invention can also be used for other installations in which a gas mixture is produced and $SO_2$ or other corrrosive gases must be separated therefrom. The bed of grained adsorption medium travels inside the reactor from above downwardly in a continuous or stepped manner. The adsorption medium is basically a medium which provides for a maximum adsorption efficiency for $SO_2$ or other corrosive gases, particularly carbon-containing adsorption medium in form of activated coal or molecular filters.

The heat exchanger inserted in the adsorption medium bed does not undesirably affect either the flow of the waste gas or the moving of the adsorption medium. When the heat exchanger is formed as a row of pipes arranged near one another as shown in FIG. 3, a sufficient space remains between neighboring pipes for passage of the waste gas. The row of pipes is introduced into the adsorption medium bed in a plane transverse to the direction of gas flow, and advantageously the direction of the pipes is identical to the moving direction of the adsorption medium. The heat exchanger including several such rows arranged parallel to one another at distances from one another, as shown in FIG. 4, further improves the above mentioned characteristics. The adsorption reactor itself is designed so that it provides for a maximum possible throughflow surface for the gas flow with a relatively small throughflow depth. For this purpose the walls 1 and 3 through which the gas enters and exits are formed with the ribs 5 which are inclined and offset from one another as shown in FIG. 3.

When the adsorption reactor is designed and the adsorption method is performed in accordance with the present invention, the waste gas with a relatively high temperature can enter the adsorption reactor so that the corrosion danger, because of formation of sulfuric acid, is excluded. At this temperature, which for example lies above 150° C., the sulfuric acid portion of the fumes is first separated. This leads to lowering of the sulfuric acid dew point to the value of for example under 45° C. Thereby the corrosion on the outer walls of the heat exchanger is prevented. The heat exchanger further provides for the desired cooling of the fumes to the temperature with which the separation of $SO_2$ relative to the entrance temperature in the adsorption reactor is improved. Moreover, the heat removed from the waste gas can be advantageously utilized, for example, supplied in a remote heating network. In a surprising manner, the consumption on the heat exchange surface with the heat exchanger inserted in the adsorption medium is smaller than when the waste gas directly contacts the heat exchanger. Thereby the heat exchanger surfaces can be kept relatively small. Generally speaking, the inventive reactor and method provide for simultaneous improvement of the $SO_2$ separation and a particularly advantageous utilization of the energy content of the waste gas and its cooling to the temperatures of, for example, 90° C.

It is especially advantageous when the waste gas with a substantially entrance temperature of the adsorption reactor first flows through a first region of the adsorption medium bed and is first cooled in the gas flow direction where in one or more regions of the adsorption medium bed the adsorption proceeds further. Further temperature decrease can take place between the individual regions of the adsorption medium bed.

EXAMPLE

A conventional activated coal with a specific surface of 500 m²/g, indicated as Brunauer Emmett and Teller, is used as a carbon-containing adsorption medium. The moving bed reactor has a cross sectional area transverse to the flow direction of the waste gas of 135 m² and has a bed depth of 1.66 m. It is filled, in correspondence with its height, with 224 m³ of the adsorption medium.

With the temperature of 150° C., 120,000 m³/h of power plant waste gas (counted in standard conditions) containing 0.1 vol.-% $SO_2$, 6.4 vol.-% $O_2$, and 10.1 vol.-% of water vapor is supplied with a space velocity (relative to the empty adsorber) of 800 $h^{-1}$ (counted at 150° C.) through the moving bed. The heat exchanger is formed as a pipe with an opening width of 20 mm and a wall thickness of 2.5 mm with three pipe rows each having 100 rows. These pipe rows are arranged at distances of 0.41, 0.81 and 1.23 m from the throughflow surface of the adsorber parallel to the latter, as shown in FIG. 4. The adsorption medium moves through the adsorption reactor from an upper supply point to a lower discharge point in substantially 60 h.

The concentration of $SO_2$ of the waste gas is reduced to 0.03 vol.-% (gas desulfurization degree 97%). The waste gas has an average outlet temperature from the adsorption reactor of 90° C. Cooling water flows through the pipes parallel with a volume flow of total 520 m³/h and is heated from 60° to 100° C.

When the waste gas flows through the adsorption reactor with the same conditions but without passage through the heat exchanger of a cooling medium, a temperature increase of the waste gas because of the adsorption heat is approximately by 4° C., and the outlet concentration of $SO_2$ is 0.038 vol.-% which corresponds to a desulfurization degree of 62%.

It will be understood that each of the elements described above, or two or more together, may also find a useful application in other types of constructions differing from the types described above.

While the invention has been illustrated and described as embodied in an adsorption reactor for removing $SO_2$ and the like, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An adsorption reactor for removing $SO_2$ and the like from waste gases, comprising
   a single bed of a grained adsorption medium moving in a substantially downward direction and arranged so that waste gases pass through said bed in a gas flow direction transversely of the adsorption medium movement direction; and
   a temperature separating permeable member formed by heat exchanger tubes inserted in said single bed of a grained adsorption medium and subdividing said single bed into at least a first adsorption layer located upstream of said heat exchanger pipes in said gas flow direction so that waste gases pass said first adsorption layer at a higher temperature, and a second adsorption layer located transversely adjacent to said first adsorption layer and downstream of said heat exchanger pipes in said gas flow direction so that the waste gases pass second adsorption layer at a lower temperature.

2. An adsorption reactor as defined in claim 1, wherein said bed of a grained adsorption medium is substantially tubular, said heat exchanger being also tubular.

3. An adsorption reactor as defined in claim 1, wherein said heat exchanger includes a row of heat exchanging pipes, arranged in said bed of an adsoprtion medium.

4. An adsorption reactor as defined in claim 3, said heat exchanger includes a second row of heat exchanging pipe, said rows of heat exchanging pipes being spaced from one another in a direction of passage of waste gases through the bed of an adsorption medium.

5. A method of adsorption for removing $SO_2$ and the like from waste gases, comprising the steps of passing waste gases through a single bed of a grained adsorption medium moving from above downwardly, in a gas passage direction transversely of the adsorption medium movement direction; and arranging a temperature separating permeable member formed by a heat exchanger in the bed of the grained adsorption medium and subdividing said single bed into at least a first adsorption layer located upstream of the heat exchanger pipes in said gas flow direction so that waste gases pass said first adsorption layer at a higher temperature, and a second adsorption layer located transversely adjacent to said first adsorption layer and downstream of said heat exchanger pipes on said gas flow direction so that the waste gases pass second adsorption layer at a lower temperature.

6. A method as defined in claim 5, wherein said passing step includes admitting waste gases with a temperature above substantially 120° C., passing through a first region of the bed of a grained adsorption medium with fluid-cooling, and further passing the waste gases through at least one further region of said bed of a grained adsorption medium before it leaves the same with a temperature of below substantially 120° C.

7. A method as defined in claim 6; and further comprising the step of increasing cooling between the regions of the bed of a grained adsorption medium, in a direction of passage of gases through the bed of an adsorption medium.

8. A method as defined in claim 6, wherein said fluid-cooling step includes utilization of a cooling fluid for remote thermal heating.

* * * * *